US005818475A

United States Patent [19]

Miyazaki et al.

[11] Patent Number: 5,818,475

[45] Date of Patent: Oct. 6, 1998

[54] METHOD AND APPARATUS FOR MEASURING AMOUNT OF INK DISCHARGE

[75] Inventors: Takeshi Miyazaki, Ebina; Katsuhiro Shirota; Makoto Akahira, both of Kawasaki; Koichiro Nakazawa, Tokyo, all of Japan

[73] Assignee: Canon Kabushiki Kaisha, Tokyo, Japan

[21] Appl. No.: 691,586

[22] Filed: Aug. 2, 1996

[30] Foreign Application Priority Data

| | | | |
|---|---|---|---|
| Aug. 22, 1995 | [JP] | Japan | 7-213376 |
| Jul. 25, 1996 | [JP] | Japan | 8-196187 |

[51] Int. Cl.[6] .............................. B41J 2/01; G01N 21/00

[52] U.S. Cl. .............................. 347/19; 356/436

[58] Field of Search .............................. 347/7, 19, 14; 73/861.07; 356/436, 432

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 4,774,055 | 9/1988 | Wakatake et al. | 422/64 |
| 5,387,976 | 2/1995 | Lesniak | 356/379 |
| 5,508,722 | 4/1996 | Saito et al. | 347/17 |

FOREIGN PATENT DOCUMENTS

| | | |
|---|---|---|
| 289789 | 11/1988 | European Pat. Off. . |
| 54-56847 | 5/1979 | Japan . |
| 59-123670 | 7/1984 | Japan . |
| 59-138461 | 8/1984 | Japan . |
| 60-71260 | 4/1985 | Japan . |

*Primary Examiner*—Benjamin R. Fuller
*Assistant Examiner*—Craig A. Hallacher
*Attorney, Agent, or Firm*—Fitzpatrick, Cella, Harper & Scinto

[57] ABSTRACT

Disclosed is an apparatus for automatically measuring the amount of ink discharged from an inkjet printhead. A predetermined amount of pure water is injected into a measurement bottle, the bottle is supplied via an insertion port to a rotary table for measurement purposes, and the rotary table is rotated by 90° to bring the bottle to a point immediately underlying a nozzle of the inkjet printhead. Ink is then discharged into the bottle from the printhead under set measurement conditions. The rotary head is then rotated a further 90° to bring the bottle to a point in front of a photometer. At this time the ink solution is stirred thoroughly and the absorbance thereof is measured by the photometer. When measurement is completed, the rotary table is rotated a further 90° to discard the bottle from a discharge port. These steps are automated by computer control.

19 Claims, 10 Drawing Sheets

METHOD AND APPARATUS FOR MEASURING AMOUNT OF INK DISCHARGE

BACKGROUND OF THE INVENTION

This invention relates to a method and apparatus for measuring amount of ink discharge and, more particularly, to a method and apparatus for measuring amount of ink discharged from the nozzles of a printhead in accordance with the inkjet method.

Color unevenness is a major problem in terms of achieving improved image quality of a color image using the inkjet printing method.

Color unevenness is dependent upon a variance in the absolute quantity of ink discharged from an inkjet printhead onto a medium (i.e., material to be printed on). First of all, therefore, it is necessary to accurately determine the amount of ink discharged from each nozzle of the inkjet printhead and control printing on the basis of the amount of ink discharge.

Several methods of measuring amount of ink discharged are known in the prior art. Typical examples are a weight method and absorbance method.

According to the weight method, ink discharged from the inkjet printhead is received by a vessel of some kind and this is actually weighed by a scale or the like to measure the weight of the discharged ink.

With the absorbance method, water, for example, serving as a solvent is introduced into a test tube, ink is discharged into the test tube and stirred thoroughly, and the absorbance of the stirred ink solution is measured to estimate the amount of ink discharged.

However, the problems set forth below are encountered in the above-mentioned prior art.

Specifically, with the weight method, ink having a certain degree of weight is required in order to measure the amount of ink discharged. A considerable length of time is needed to obtain this ink by discharging it from the printhead. In addition, the measurement precision of the weight method is fundamentally not as good as that of the absorbance method.

In case of the absorbance method, measurement of the absorbance of the ink solution in the test tube is itself capable of being performed in a short time. However, the operation to prepare for measurement, namely the operation for discharging the ink from each nozzle of the inkjet printhead, dissolving the ink in the solvent and stirring the solution, must be performed manually. The overall measurement, therefore, takes a long period of time.

Furthermore, regardless of whether the weight method or absorbance method is used, individual differences between persons taking the measurements affect the precision of measurement. Accordingly, more objective measurement from which discrepancies due to individual differences have been eliminated is desired.

SUMMARY OF THE INVENTION

Accordingly, it is an object of the present invention to provide an apparatus capable of measuring amount of ink discharged from an inkjet printhead with a high precision, at high speed and in automatic fashion.

According to the present invention, the foregoing object is attained by providing an apparatus for measuring amount of ink discharged from an inkjet printhead, comprising a vessel, injecting means for injecting a predetermined amount of solvent into the vessel, drive means for driving the inkjet printhead to discharge the ink into the vessel into which the solvent has been injected, stirring means for stirring the solution of discharged ink and solvent, measuring means for drawing in the stirred solution, measuring absorbance of the solution and estimating amount of ink discharge based upon the measured absorbance, and control means for controlling the injecting means, the drive means, the stirring means and the measuring means in such a manner that the injection by the injecting means, the ink discharge by the drive means, the stirring by the stirring means and the measurement and estimation by the measuring means are performed in succession automatically.

It is another object of the present invention to provide a method capable of measuring amount of ink discharged from an inkjet printhead with a high precision, at high speed and in automatic fashion.

According to the present invention, the foregoing object is attained by providing a method of measuring amount of ink discharged from an inkjet printhead, comprising, an injecting step of injecting a predetermined amount of solvent into a vessel, an ink discharging step of driving the inkjet printhead to discharge ink into said vessel into which the solvent has been injected, a stirring step of stirring the solution of the discharged ink and solvent, and a measuring step of measuring absorbance of the stirred solution and estimating amount of ink discharged based upon the measured absorbance.

In accordance with the present invention as described above, measurement of the amount of ink discharged from an inkjet printhead involves injecting a predetermined amount of solvent into a vessel, driving the inkjet printhead to discharge ink into the vessel containing the solvent, stirring the solution of the discharged ink and solvent, drawing in the stirred solution and measuring the absorbance thereof, estimating the amount of ink discharged based upon the measured absorbance, and discarding the vessel containing the solution whose absorbance has been measured. Control is performed in such a manner that the steps of injection of the solvent into the vessel, the discharge of the ink, the stirring of the solution, the measurement of absorbance, the estimation of amount of ink discharged and the discarding of the vessel are carried out automatically in sequential fashion.

It is preferred that the vessel exhibits a light transmitting property.

Further, control may be performed in such a manner that the vessel is washed and dried instead of being discarded.

The inkjet printhead is one that utilizes a piezoelectric element or one that discharges ink by utilizing thermal energy. In the latter case, the inkjet printhead is equipped with a thermal energy generator for generating thermal energy applied to the ink.

The measurement described above may employ means for setting the conditions of measurement and with means for storing a plurality of vessels. The setting means includes display means for displaying a menu of measurement conditions and input means for entering the measurement conditions.

The measurement described above is capable of using a circular rotary table equipped with, e.g., four receptacles on the circumferential portion thereof for receiving vessels at fixed intervals, e.g., at angular intervals of 90°, the table being rotated through increments of 90°.

When the rotary table is used, the means for storing the plurality of vessels is provided on the lower portion of the rotary table and supplies a vessel to one of the four receptacles provided on the rotary table. Provided along the circumference of the rotary table at intervals of, say, 90° are (1) supply means for supplying the vessel to the receptacle from the storing means and injecting means for injecting a solvent into the vessel, (2) drive means for driving the inkjet printhead so as to discharge ink, (3) stirring means for stirring the solution of ink and solvent and measuring means for measuring the absorbance of the solution and estimating the amount of ink discharged, and (4) discarding means for discarding the vessel containing the solution whose absorbance has been measured.

The drive means drives the inkjet printhead in accordance with set measurement conditions.

Furthermore, memory means may be provided for storing data representing the amount of discharged ink estimated by the measuring means, as well as output means for printing out the amount of ink discharged from the inkjet printhead on the basis of the estimated amount of discharged ink or the data, which represent the amount of discharged ink, stored in the memory means. A portable storage medium such as a floppy disk can be used as the memory means.

The solvent includes pure water or a pH buffer solution.

The invention is particularly advantageous in that the amount of ink discharged from the inkjet printhead can be measured automatically, accurately and in a short period of time.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

A preferred embodiment of the present invention will now be described in detail in accordance with the accompanying drawings.

<General description of apparatus>

Figure 1:
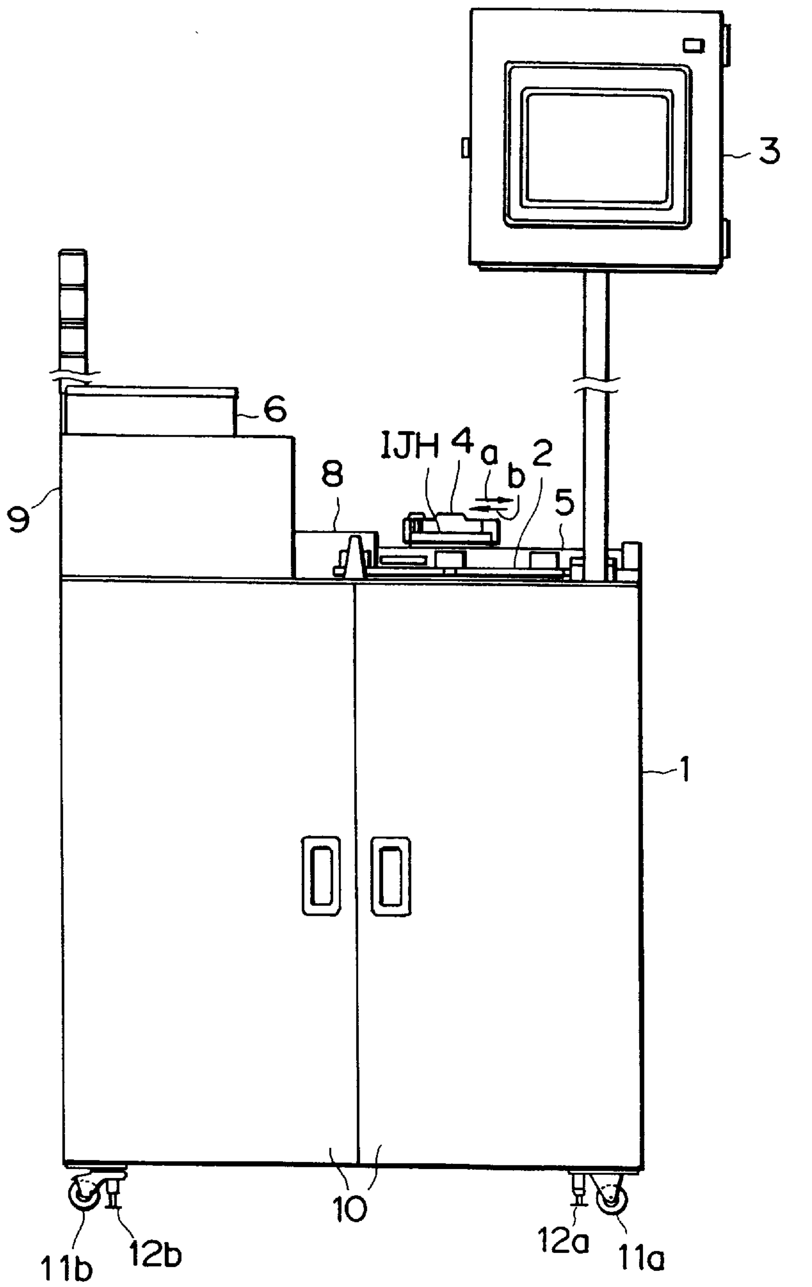
FIG. 1 is a front view showing the external appearance of an apparatus for automatically measuring amount of ink discharge according to a typical embodiment of the present invention.
Figure 2:
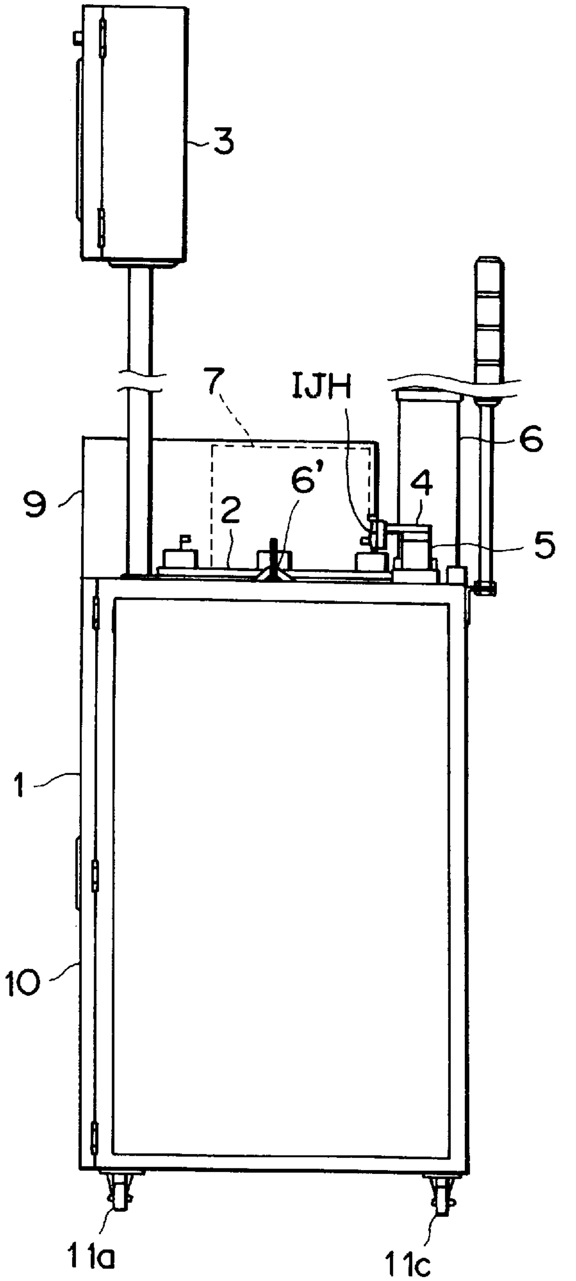
FIG. 2 is a side view showing the external appearance of the apparatus, which is illustrated in FIG. 1, for automatically measuring amount of ink discharge.
Figure 3:
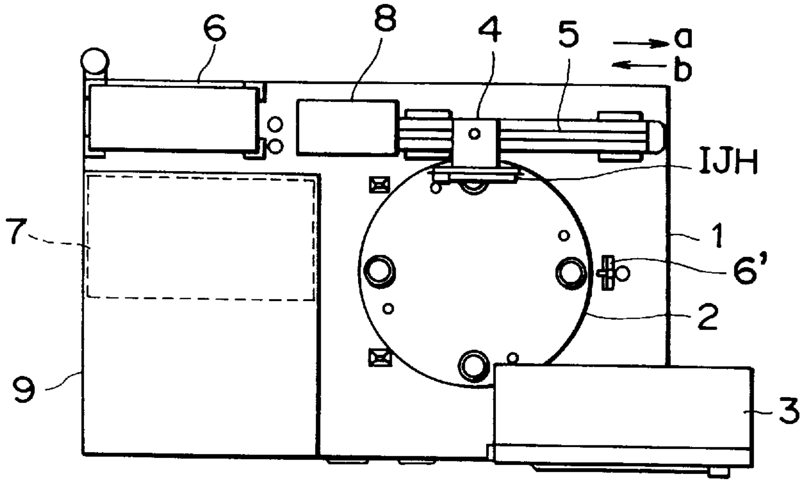
FIG. 3 is a top view showing the external appearance of the apparatus, which is illustrated in FIG. 1, for automatically measuring amount of ink discharge.

FIG. 1 is a front view showing the external appearance of an apparatus for automatically measuring amount of ink discharge according to a typical embodiment of the present invention, FIG. 2 is a side view of the apparatus and FIG. 3 is a top view of the apparatus.

In FIGS. 1 through 3, an inkjet printhead IJH has a plurality of discharge nozzles which perform printing in accordance with the inkjet method. Numeral 1 denotes the apparatus proper, which has a rotary table 2 that is rotated through increments of 90°, an LCD display monitor 3 for displaying instructions to set measurement conditions as well as the operating status of the apparatus, an inkjet printhead mounting portion 4 for mounting the inkjet printhead IJH, a guide rail 5 along which the inkjet printhead mounting portion 4 is moved back and forth in the directions of arrows a and b, a tank 6 storing a solvent, a suction nozzle 6', a photometer 7 capable of measuring the absorbance of the intake solution using a plurality of wavelengths, a positioning controller 8 capable of moving the inkjet printhead mounting portion 4 in the directions of arrows a and b to position the inkjet head mounting portion 4 at a precision equivalent to the spacing of the nozzles of inkjet printhead IJH, doors 10 for opening and closing the apparatus, wheels for a control unit 9 controlling an overall operation of the apparatus 11*a* through 11*c* for moving the apparatus, and stoppers 12*a*, 12*b* for securing the apparatus. The LCD display monitor 3 incorporates a touch panel by which the apparatus is instructed to perform various operations.

The rotary table 2 is provided with four retaining holes which retain bottles or test tubes for receiving ink discharged from the inkjet printhead IJH. The holes are provided every 90° along the circumference of the rotary table 2.

Figure 4:
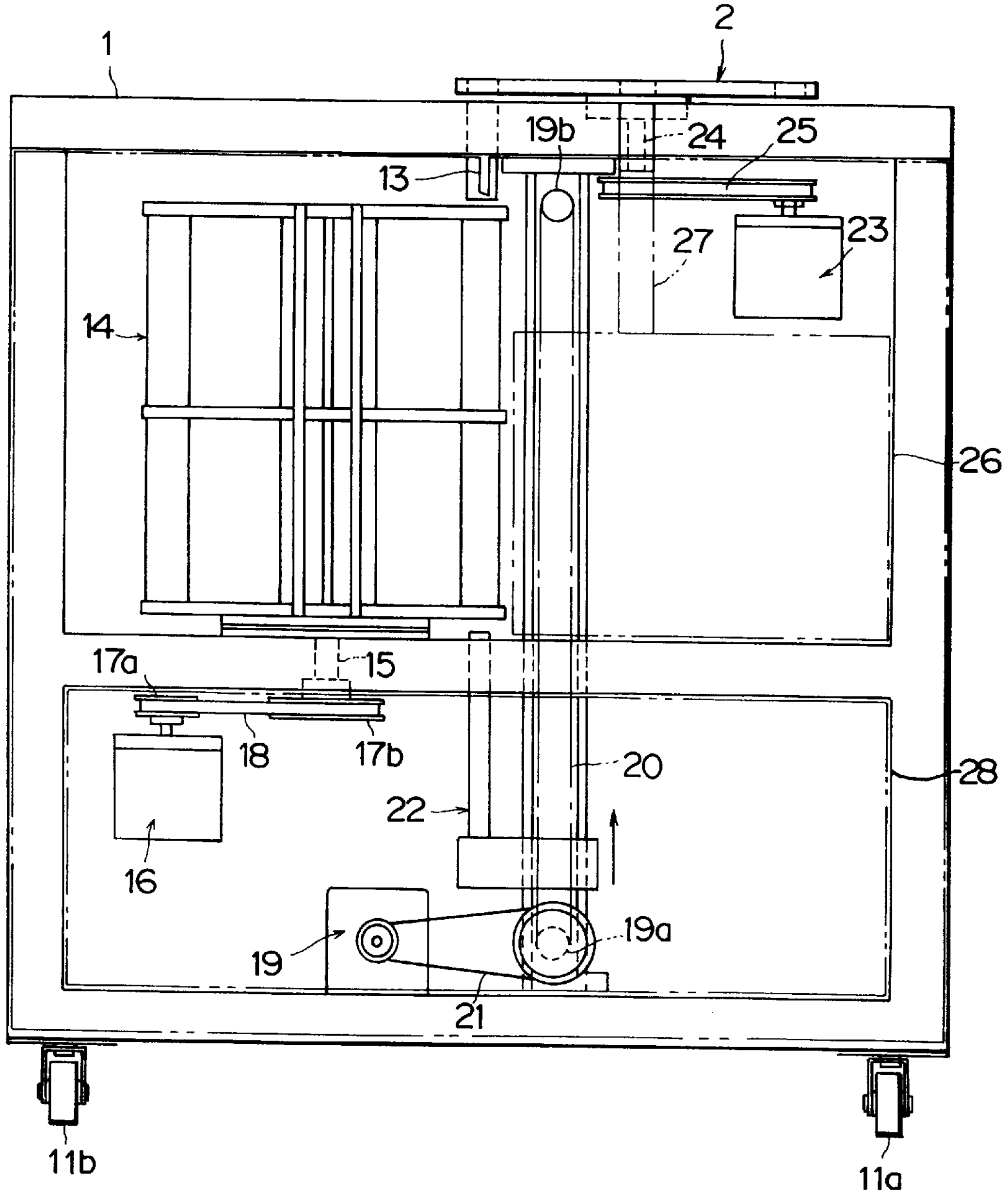
FIG. 4 is a diagram showing the internal structure of the apparatus, which is illustrated in FIG. 1, for automatically measuring amount of ink discharge.

FIG. 4 is a diagram showing the internal structure of the apparatus from which the doors 10 have been removed. As shown in FIG. 4, a solvent injecting port 13 through which the solvent stored in the tank 6 is injected into the bottles or test tubes for measurement of amount of ink discharge. A rotary bottle rack 14 having a rotary shaft 15 accommodates a plurality of the bottles or test tubes which receive the ink. A rack rotating motor 16 rotates the bottle rack 14. Pulleys 17*a*, 17*b* transmit the rotating force of the rack rotating motor 16 to the rotary shaft 15, and a belt 18 transmits rotational motion from the pulley 17*a* to the pulley 17*b*.

A bottle elevating motor 19 moves a bottle or test tube, which has been accommodated in the bottle rack 14, in the upward direction and inserts it in a retaining hole of the rotary table 2. Pulleys 19*a*, 19*b* transmit the rotating force of the bottle elevating motor 19, and belts 20, 21 transmit the rotational motion. A bottle elevating lift 22 is moved up and down with movement of the belt 20 to push up a bottle or test tube from below. A table motor 23 is for rotating the rotary table 2, which has a rotary shaft 24. A belt 25 transmits the rotating force of the table motor 23 to the rotary shaft 24.

A bottle discarding box 26, which is detachable, temporarily accommodates bottles or test tubes following measurement of amount of discharged ink. A discarding path 27 is traversed by a bottle or test tube in order for the bottle or test tube, which is secured to the rotary table 2, to be discarded into the box 26. A power supply unit 28 supplies each of the apparatus components with the electrical power required.

Figure 5:
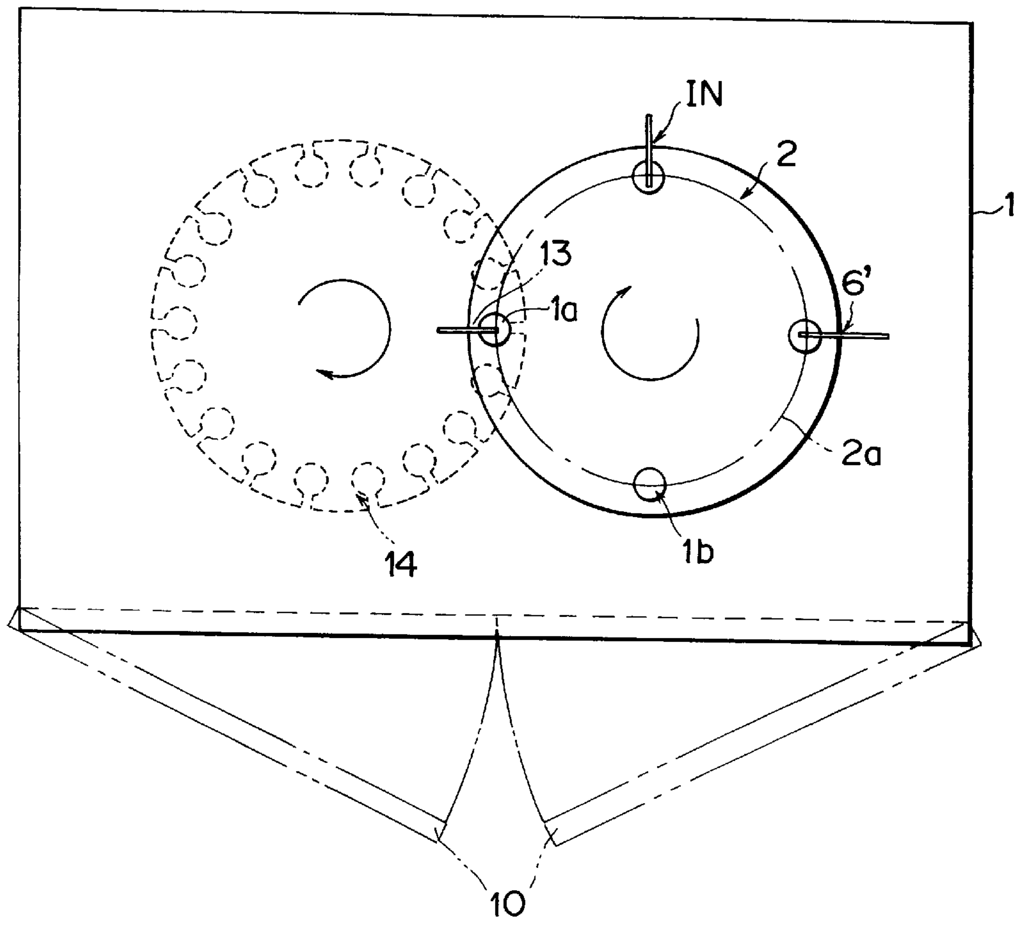
FIG. 5 is a diagram illustrating the manner of operation from supply of a measurement bottle to measurement of amount of ink discharge in the apparatus, which is illustrated in FIG. 1, for automatically measuring amount of ink discharge.

FIG. 5 is a diagram showing the manner in which a bottle or test tube accommodated in the bottle rack 14 is supplied to one retaining hole in the rotary table 2, as well as the manner in which the amount of discharged ink is measured using the bottle or test tube retained in the rotary table 2.

Figure 6:
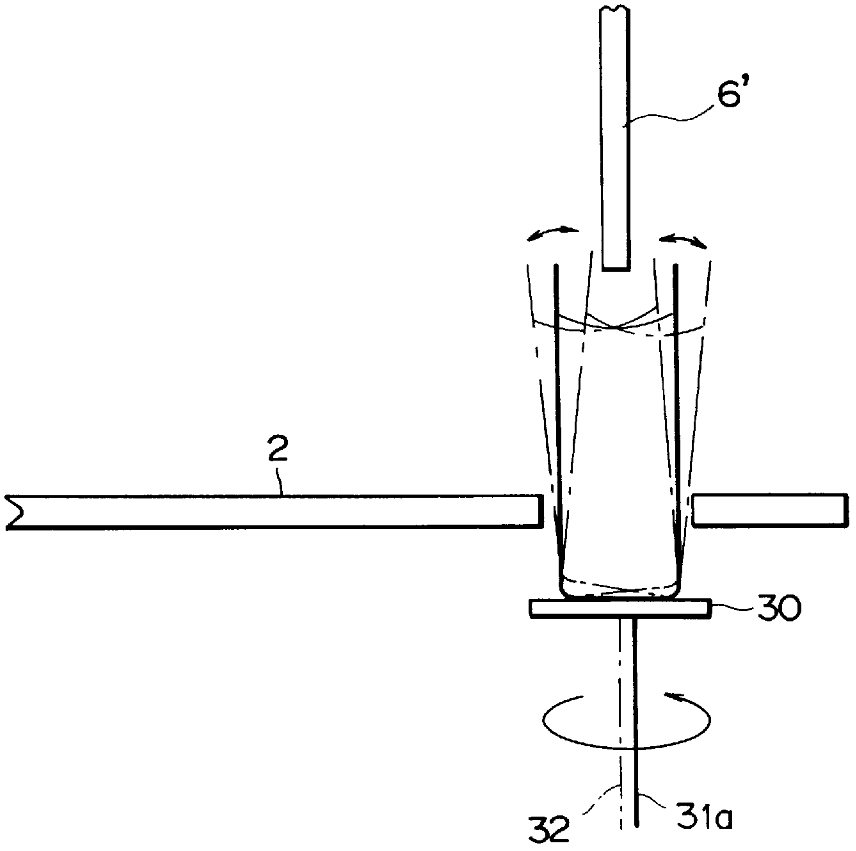
FIG. 6 is a diagram for describing the stirring of an ink solution.

FIG. 6 is a diagram for describing the stirring of a solution contained in a bottle or test tube supplied to and held by the rotary table 2.

As shown in FIG. 5, both the bottle rack 14 and rotary table 2 rotate clockwise about their respective axes of rotation. The bottle rack 14 and rotary table 2 are so provided that the center of one retaining hole in the rotary table 2 and the center of a bottle or test tube accommodating portion, a plurality of which are provided in the bottle rack 14, will exactly overlap each other. Further, a bottle or test tube insertion port 1*a* is provided in the top side of the apparatus body 1 at the location at which the center of the one retaining hole in the rotary table 2 and the center of a bottle or test tube accommodating portion provided in the bottle rack 14 exactly overlap each other, and a bottle or test tube discharge port 1*b* is provided in the top side of the apparatus body 1 at a location 90° removed, in the counter-clockwise direction about the axis of rotation of rotary table 2, from the insertion port 1*a*, namely above the discard path 27.

A guide line (not shown) is provided in the apparatus body 1 below the rotary table 2 along the one-dot chain line for the purpose of moving a bottle or test tube smoothly with rotation of the rotary table 2 without damaging the bottle or test tube.

A rotary table 30 for stirring the solution contained in a bottle or test tube is provided at a location at which the suction nozzle 6' on the guide line is situated, as shown in FIG. 6. The rotary table 30 is circular but has a rotary shaft 31*a* slightly offset from the center 32. The rotary table 30 is rotated by a stirring motor (not shown). When the rotary table 30 is rotated, the bottle or test tube placed upon the table 30 undergoes precessing motion owing to the offset of the rotary shaft 31*a* from the center of the table. As a result, the solution contained in the bottle or test tube is stirred.

By way of example, a predetermined amount of solvent is injected into a bottle or test tube from the solvent injecting port 13, after which one accommodating portion and one retaining hole are made to overlap each other. At this time the bottle elevating lift 22 is elevated to push up the bottle or test tube from below, whereupon the bottle or test tube is inserted into the one retaining hole of the rotary table 2 through the insertion port 1*a*. Next, the rotary table 2 is rotated, whereupon the bottle or test tube separates from the insertion port 1*a*. Accordingly, the bottle or test tube moves along the guide line (not shown) without falling. When the rotary table 2 is rotated 90° in the clockwise direction, the retained bottle or test tube comes to be situated directly below one nozzle IN of the inkjet printhead IJH.

When the inkjet printhead IJH is driven in this state under conditions described below, ink is discharged from the nozzle IN into the bottle or test tube into which the solvent has been injected. When the discharge ends, the rotary table 2 is rotated 90° in the clockwise direction so that the bottle or test tube into which the ink has been discharged arrives at the position at which the photometer 7 performs measurement. The rotary table 30 is provided at this position, as mentioned above. First, the solution contained in the bottle or test tube is stirred sufficiently on the table 30. Next, the solution contained in the bottle or test tube is drawn in by the suction nozzle 6' and introduced to the photometer 7, where the absorbance of the solution (the solvent and the discharge ink) is measured through a flow-cell method. When this measurement ends, rotary table 2 is rotated a further 90° in the clockwise direction so that the bottle or test tube whose measurement has been completed arrives at a point above the discard path 27. Since the discharge port 1*b* is provided at this location, the bottle or test tube retained in the rotary table 2 drops from the discharge port 1*b* into the immediately underlying bottle discard box 28 via the discard path 27.

In the above procedure, the photometer 7 measures the absorbance of the solution after the suction nozzle 6' draws in the solution. In a case where a bottle or test tube, which exhibits a light transmitting property, is used, it is possible to measure the absorbance of the solution without drawing in the solution by the suction nozzle 6'.

This ends one series of operations and completes the measurement of amount of discharged ink. This description has been rendered from the viewpoint of how processing is executed with regard to one bottle or test tube. However, since the rotary table 2 of the apparatus is rotated 90° at a time, it goes without saying that bottles or test tubes may be supplied from the bottle rack 14 to the rotary table 2 one after another every 90° of rotation and may be discarded into the bottle discarding box 28 from the rotary table 2. A bottle washing step may be added so that bottles may be reutilized.

Discharged ink may be received by each of a plurality of bottles or test tubes under respective ones of a plurality of ink discharge conditions using a single nozzle. Alternatively, discharged ink from each of a plurality of nozzles may be received by bottles or test tubes one at a time while the inkjet printhead IJH is moved in increments equivalent to one nozzle pitch (nozzle spacing) by the positioning controller 8 under a fixed ink discharge condition.

<General description of apparatus controller>

Figure 7:
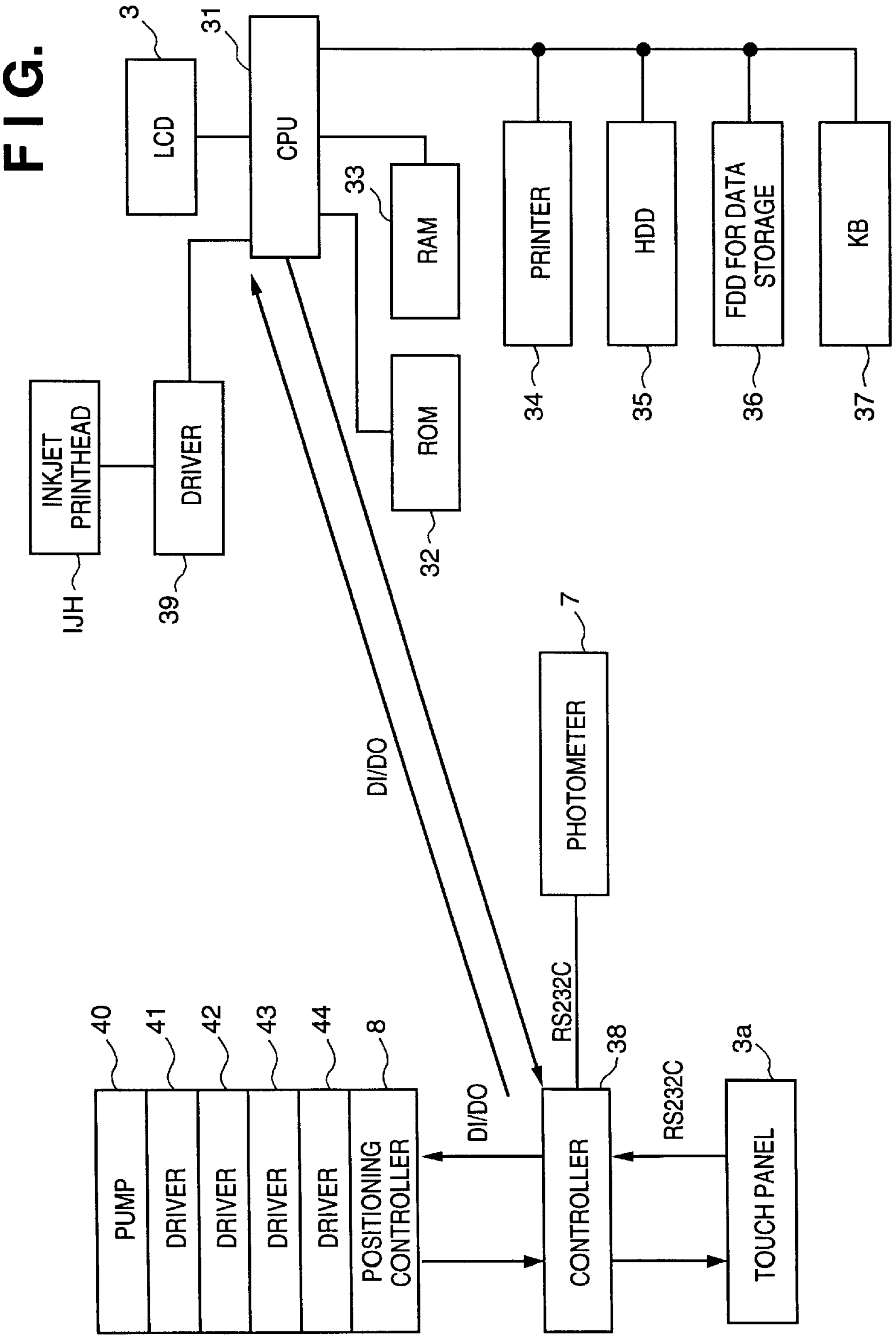
FIG. 7 is a block diagram illustrating the architecture of a control circuit in the apparatus, which is illustrated in FIG. 1, for automatically measuring amount of ink discharge.

FIG. 7 is a block diagram showing the control architecture of the apparatus. A CPU 31 controls the overall apparatus, and a ROM 32 stores a control program executed by the CPU 31, various test patterns for driving the inkjet printhead IJH, and a plurality of tables indicating the relationships between absorbance and amount of ink discharge dependent upon wavelength. A RAM 33 is used as the working area of the control program executed by the CPU 31. A printer 34 is used to print out the results of measurement. A hard disk (HDD) 35 stores measurement data and the like, and a floppy disk 36 is used to permanently save measurement data, etc. A keyboard (KB) 37 is for inputting various commands to the apparatus, and a controller 38 controls the photometer and various actuators, described below, in accordance with control signals from the CPU 31. A driver 39 controls the inkjet printhead IJH. Various commands from the touch panel 3*a* are transmitted to the CPU 31 via the controller 38.

In this embodiment, the controller 38 and photometer 7 are interconnected by an RS-232C interface, and so are the controller 38 and touch panel 3*a*. The controller 38 controls a pump 40, which charges solvent into the bottles or test tubes in predetermined amounts (30 ml in this example) from the solvent tank 6, a driver 41 which drives the bottle elevating motor 19, a driver 42 for driving the rack rotating motor 16 that rotates the bottle rack 16, a driver 43 for driving the table motor 23 that drives the rotary table 2, a driver 44 for driving the stirring motor (not shown) that rotates the rotary table 30, and the positioning controller 8 for positioning the inkjet printhead IJH. The controller 38 exchanges a control signal (DI) and a response signal (DO) with the pump 40, drivers 41~44 and positioning controller 8. Similarly, the CPU 31 exchanges a control signal (DI) and a response signal (DO) with the controller 38.

<General description of inkjet printhead>

Figure 8:
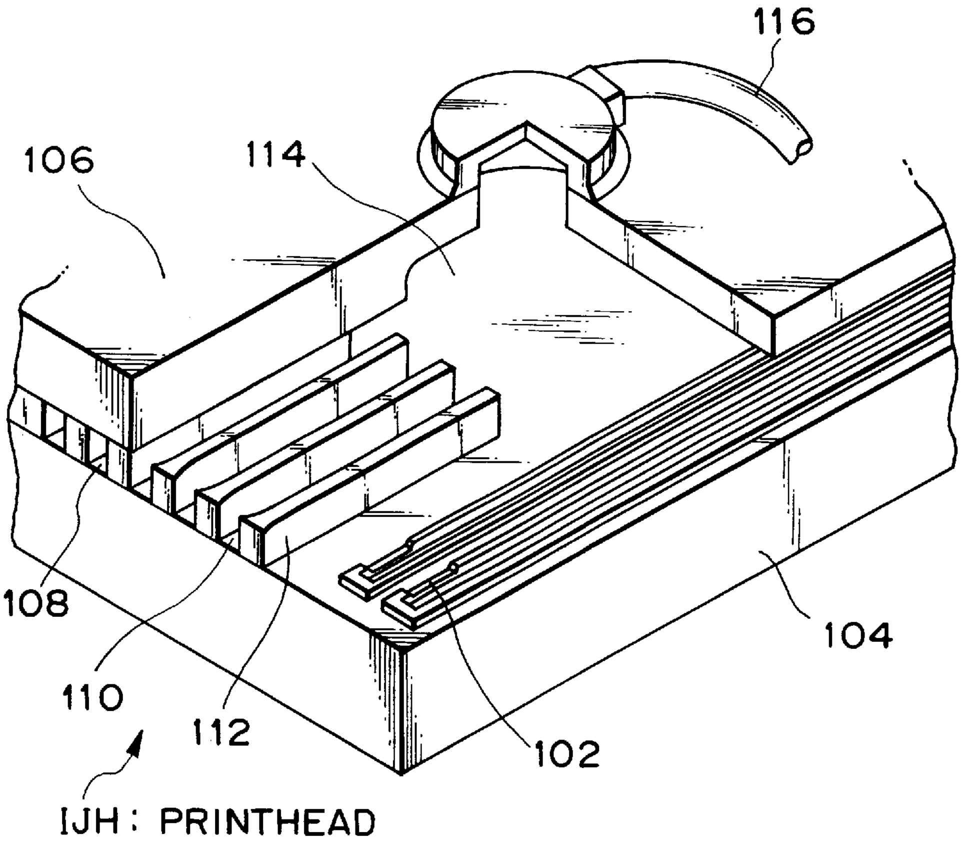
FIG. 8 is a perspective view, partially cut away, showing the internal structure of an inkjet printhead.

FIG. 8 is a perspective view, partially cut away, showing the internal structure of the inkjet printhead IJH which performs printing in accordance with the inkjet method used in measuring amount of ink discharge.

As shown in FIG. 8, the inkjet printhead IJH generally comprises a heater board 104, which is a base plate on which a plurality of heaters 102 for heating ink are formed, and a top plate 106 placed on the heater board 104. The top plate 106 is formed to have a plurality of orifices 108 in back of which tunnel-shaped fluid passageways 110 communicating to the orifices 108 are formed. Each passageway 110 is isolated from its neighbors by partitioning walls 112. The fluid passageways 110 are connected to a single, common ink chamber 114 at the rear. The ink chamber 114 is supplied with ink via an in supply tube 116 and the ink is in turn supplied from the ink chamber 114 to the passageways 110.

The heater board 104 and top plate 106 are positioned to assemble the inkjet printhead IJH in the state shown in FIG. 8 in such a manner that the heaters 102 will assume positions corresponding to the passageways 110. Though only two heaters 102 are shown in FIG. 8, in actuality one heater 102 is provided so as to correspond to each passageway 110.

When predetermined drive pulses are supplied to the heaters 102 with the inkjet printhead IJH in the assembled state shown in FIG. 8, the ink on the heaters 102 boils and forms bubbles. Owing to volumetric expansion of the bubbles, the ink is discharged by being forced out of the orifices 108. Accordingly, it is possible to regulate the size of the bubbles by controlling the drive pulses applied to the heaters 102, as by controlling the magnitude of the electrical power supplied. The volume of the ink discharged from orifices can be controlled at will.

The processing for automatically measuring amount of ink discharge using the apparatus having the construction set forth above will now be described with reference to an example of a display screen, shown in FIG. 9, for setting measurement conditions, and a flowchart illustrated in FIG. 10. In the processing described below, it is assumed that the inkjet printhead IJH has already been mounted on the apparatus, that bottles for measuring ink discharge have been placed in the bottle rack 14, and that pure water has been collected in the tank 6.

The inkjet printhead IJH is mounted on the inkjet printhead mounting portion 4 at step S10. Next, the operator of the apparatus sets the measurement conditions at step S20 while observing the menu displayed on the display screen of the LCD 3 shown in FIG. 9. Here the operator sets the total number (TN) of nozzles provided on the inkjet printhead to be measured as well as the nozzle pitch (NP). For example, if the printing density of the inkjet printhead to be measured is 300 dpi and the printing width is the width (210 mm) of size A4 paper, then the operator makes the settings TN=2977 (nozzles) and NP=70.5 ($\mu$m). Other measurement conditions set are the nozzle number of the nozzle at which measurement starts [if there are 2977 nozzles (TN=2977), integers of "1" to "2977" are assigned as nozzle numbers in order that any one nozzle may be specified], measurement pitch specifying the measurement interval (this is specified by an integer, e.g., the same nozzle is measured in time-series fashion when "0" is specified, amount of ink discharge is measured in ascending order from the starting nozzle when "1" is specified, every other nozzle when "2" is specified and every two nozzles when "3" is specified), number of measurements per nozzle, number of ink discharges per measurement, ink discharge frequency (a number indicating how many times ink is discharged every second), measurement wavelength of the photometer 8 and bottle-to-nozzle spacing.

Figure 9:
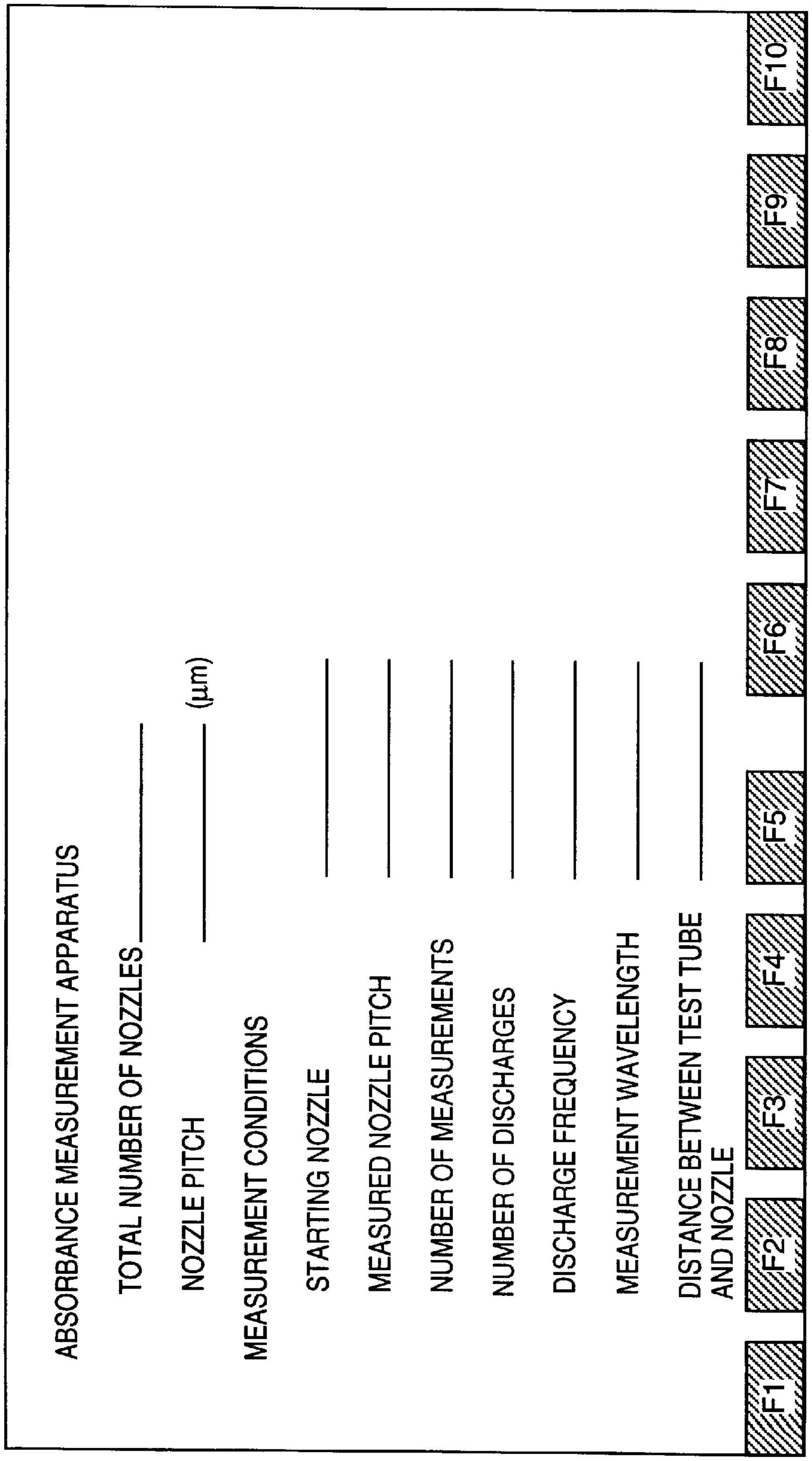
FIG. 9 is a diagram illustrating an example of a menu for setting measurement conditions for the purpose of measurement amount of ink discharge.
Figure 10:
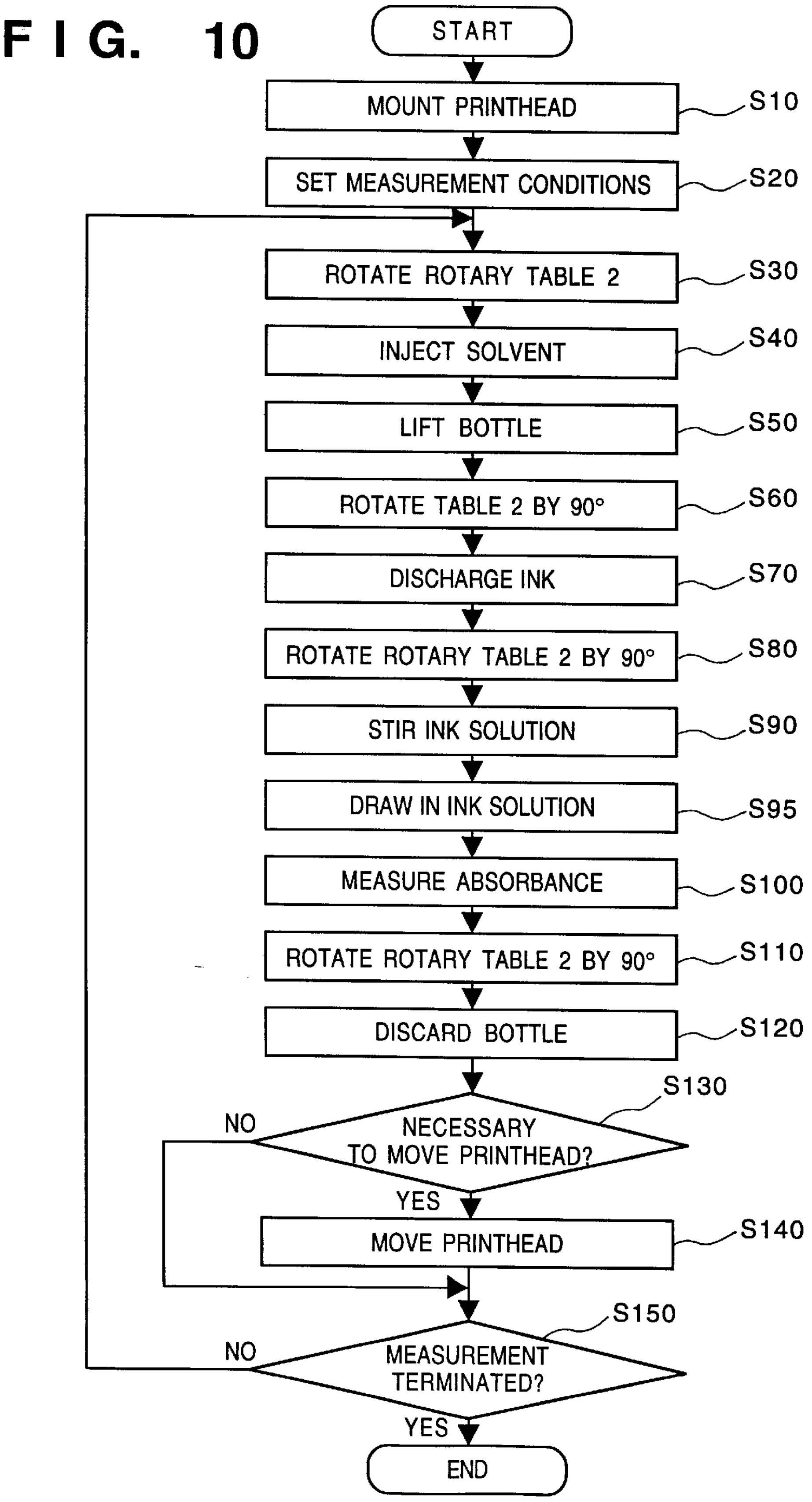
FIG. 10 is a flowchart illustrating processing for measuring amount of ink discharge.

It should be noted that F1~F10 at the bottom of the display screen shown in FIG. 9 are display zones linked to function keys provided on the keyboard 7.

When the settings described above have been completed, the inkjet printhead IJH mounted on the mounting portion 4 is moved to an ink discharge position under the control of the positioning controller 8 in accordance with the set conditions. The inkjet printhead IJH is adjusted by being moved slightly in the vertical direction in accordance with the set conditions so as to establish the specified bottle-to-nozzle spacing.

Next, at step S30, the rotary table 2 is rotated so that one retaining hole will assume a position directly above the insertion port 1*a*. This is followed by step S40, at which a predetermined amount (e.g., 30 ml) of solvent is injected into one measurement bottle from the solvent injecting port 13, and by step S50, at which the bottle into which the solvent has been injected is lifted using the bottle elevating left 22. When the bottle is inserted into one retaining hole via the insertion port 1*a*, the rotary table 2 is rotated 90° at step S60, whereby the bottle supplied is brought to a point immediately underlying the ink discharge nozzle in the inkjet printhead IJH to be measured.

Next, at step S70, ink is discharged from the nozzle, which has been specified as the starting nozzle, in accordance with the set measurement conditions. For example, if 1000 Hz has been specified as the discharge frequency and 30,000 as the number of times discharge is to be performed, then an ink discharge performed 1000 times per second is carried out for 30 seconds. When the ink discharge operation is completed, the processing proceeds to step S80, at which the rotary table 2 is rotated 90°. As a result, the bottle into which the ink has been discharged arrives at a point, directly in front of the photometer 7, above the rotary table 30. Next, at step S90, the rotary table 30 is rotated a predetermined length of time to stir the ink solution contained in the bottle. The solution is drawn in and introduced to the photometer 7 at step S95. This is followed by step S100, at which the absorbance of the ink solution is measured by the photometer 7 at the wavelength specified. The measured absorbance is converted to amount of ink discharge using the table corresponding to the measurement wavelength, this table having been stored in the ROM 32. The number of ink discharges is known from the measurement conditions. Therefore, if the estimated amount of discharged ink is divided by the number of times the ink has been discharged, the amount of ink discharge per one discharge operation will be obtained. The amount of ink discharge thus obtained is stored in the RAM 33 temporarily together with the prevailing measurement conditions. However, since the storage capacity of the RAM 33 is limited, this information is saved by being transferred to the hard disk (HDD) 35 in suitable fashion. Furthermore, the information is backed up on the floppy disk (FDD) 36 for permanent storage.

The results of measurement are printed out by the printer 34 based upon the information that has been stored in the RAM 33, hard disk (HDD) 35 or floppy disk (FDD) 36. The back-up and print commands are entered from the keyboard 37 or touch panel 3*a*.

The rotary table 2 is rotated a further 90° at step S110. As a result, the bottle whose measurement has been completed is moved to point immediately above the discharge port 1*b*. This bottle is discarded from the discharge port 1*b* at step S120. It is then determined at step S130 whether or not movement of the inkjet printhead IJH is required.

By way of example, if a value of "2" or greater has been specified as the number of times measurement is to be performed, movement of the inkjet printhead IJH is not required until measurement the specified number of times is completed. If the specified number of times is one time or measurement the set number of times is finished, it is required that control be performed to move the inkjet printhead IJH so that the next ink discharge nozzle will arrive at the point immediately overlying the ink discharge position. If such movement is necessary ("YES" at step S130), the processing proceeds to step S140, where the inkjet printhead IJH is moved in accordance with the measurement conditions. For example, the inkjet printhead IJH is moved 70.5 μm if the measurement nozzle pitch is "1" and 141 μm if the measurement nozzle pitch is "2". The program then proceeds to step S150. If movement of the inkjet printhead IJH is unnecessary ("NO" at step S130), on the other hand, then the processing proceeds to step S150.

It is determined at step S150 whether or not the measurement has been completed in its entirety. If it is found that overall measurement has not been completed, i.e., that measurement is to continue ("NO" at step S150), then the processing returns to step S30. If measurement is finished ("YES" at step S30), then processing is terminated.

The foregoing description has been rendered by following the movement of one bottle. However, the rotary table 2 of the apparatus is rotated 90° at a time, as mentioned above. It goes without saying, however, that bottles or test tubes may be supplied from the bottle rack 14 to the rotary table 2 one after another every 90° of rotation, the amount of injected ink measured and the bottles or test tubes discarded into the bottle discarding box 28 from the rotary table 2 one after another with rotation of the rotary table 2.

In accordance with the embodiment described above, bottles or test tubes are loaded in a bottle rack, measurement conditions are set and an inkjet printhead is mounted on the apparatus. This is followed by automatically executing a process which includes injecting a predetermined amount of solvent into a bottle or test tube held by the rack, supplying the bottle or test tube to a rotary table, injecting ink into the bottle or test tube, measuring the absorbance of the ink solution and discarding the used bottle or test tube when measurement is completed. This makes possible the efficient, rapid and highly precise measurement of amount of ink discharge without human intervention and, hence, without measurement precision being affected by individual differences.

If the inkjet printhead to be measured is a high-density full-line inkjet printhead, the printhead will be equipped with a multiplicity of discharge nozzles. The present invention applied to such an inkjet printhead exhibits particularly outstanding effects in terms of shortening the time needed to automatically measure the amount of ink discharge.

In order for measurement of amount of ink discharge from the inkjet printhead to be performed under more stable conditions in the embodiment described above, the inkjet printhead may be controlled in such a manner that the inkjet printhead is moved to the home position and ink discharged (referred to as "preliminary discharge") at a time other than when the amount of ink discharge is actually measured, e.g., when the inkjet printhead is first mounted on the apparatus. Furthermore, before the amount of ink discharge is measured, the inkjet printhead is subjected to a suction recovery operation or the ink orifices of the inkjet head are cleaned. To this end, a suction device or cleaning blade, which are mechanisms for performing these operations, may be provided at the home position.

In the embodiment described above, an inkjet printhead in which amount of ink discharge is capable of being measured at one time is one in number. However, this does not impose a limitation upon the invention. For example, the apparatus may be so adapted that a plurality of inkjet printheads are mounted on the apparatus and the amounts of ink discharged in these inkjet printheads are measured in parallel.

In the embodiment described above, no particular mention is made of the material of which the bottles or test tubes are made. If plastic bottles or test tubes are used, the bottles or test tubes tend to become charged with static electricity. When ink is discharged into such a bottle or test tube, there are instances where the ink droplets attach themselves to the side wall of the bottle or test tube owing to the accumulated static electricity and fail to mix with the solvent such as pure water. Accordingly, it is desired that the apparatus be provided with a de-electrifying device to remove the static electricity before ink is discharged. This device is unnecessary if the bottles or test tubes are made of glass. Furthermore, it is desired that a windshield mechanism be provided about the nozzles and bottle or test tube so that ink droplets discharged from the nozzles will fall into solvent such as pure water properly.

The inkjet printhead described in the foregoing embodiment of the present invention has means (e.g., an electrothermal transducer, laser beam generator, and the like) for generating heat energy as energy utilized upon execution of ink discharge, and causes a change in state of an ink by the heat energy, among the inkjet printing methods. According to this inkjet printing method, a high-density, high-precision printing can be attained.

As the typical arrangement and principle of the inkjet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full-line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

It is preferable to add pressurizing means for pressurizing the printhead in order to stabilize the printing operation, and preheating means such as an electrothermal transducers or another heating element or a combination thereof, to the above-mentioned and constructed printer.

Moreover, in the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the inkjet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

The inkjet printhead according to this invention may be mounted on an apparatus other than a printer. For example, the inkjet printhead may be mounted on and used with an apparatus provided integrally or separately as an image output terminal of an information processing apparatus such as a computer, a copier used in combination with a reader or the like, a facsimile machine having a transmitting/receiving function, a printer for printing on fabric or an apparatus that manufactures color filters.

The present invention can be applied to a system constituted by a plurality of devices or to an apparatus comprising a single device. Furthermore, it goes without saying that the invention is applicable also to a case where the object of the invention is attained by supplying a program to a system or apparatus. The invention is applicable also to inspection of head discharge in a process for manufacturing inkjet printheads.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for measuring amount of ink discharged from an inkjet printhead, comprising:

a vessel;

injecting means for injecting a predetermined amount of solvent into said vessel;

drive means for driving said inkjet printhead to discharge the ink into said vessel into which the solvent has been injected;

stirring means for stirring a solution of discharged ink and the solvent;

measuring means for measuring absorbance of the stirred solution;

estimating means for estimating amount of ink discharged based upon the measured absorbance; and control means for controlling said injecting means, said drive means, said stirring means, said measuring means and said estimating means in such a manner that the injection by said injecting means, the ink discharge by said drive means, the stirring by said stirring means, the measurement by said measuring means, and the estimation by said estimating means are performed in succession automatically.

2. The apparatus according to claim 1, further comprising discarding means for discarding said vessel into which the solution whose absorbance has been measured by said measuring means has been injected.

3. The apparatus according to claim 1, further comprising setting means for setting measurement conditions under which measurement is performed by said measuring means.

4. The apparatus according to claim 3, further comprising storage means for storing a plurality of the vessels.

5. The apparatus according to claim 4, further comprising a circular rotary table capable of being rotated, wherein said rotary table has four receptacles provided at fixed intervals along the circumference thereof, each receptacle receiving a vessel.

6. The apparatus according to claim 5, wherein said storage means is provided on a lower portion of said rotary table, and further comprising supply means for supplying said vessel from said storage means to one of said four receptacles provided on said rotary table.

7. The apparatus according to claim 6, wherein said supply means and said injecting means, said drive means, and said stirring means and said measuring means are each provided at fixed intervals along the circumference of said rotary table.

8. The apparatus according to claim 3, wherein said setting means includes:

display means for displaying a menu of the measurement conditions; and input means for inputting the measurement conditions.

9. The apparatus according to claim 3, wherein said drive means drives said inkjet printhead in accordance with the measurement conditions set by said setting means.

10. The apparatus according to claim 1, further comprising memory means for storing data representing the amount of discharged ink estimated by said estimating means; and output means for printing out the amount of ink discharged from by the inkjet printhead on the basis of the estimated amount of discharged ink or the data, which represent the amount of discharged ink, stored in said memory means.

11. The apparatus according to claim 10, wherein said memory means includes a portable storage medium.

12. The apparatus according to claim 1, wherein the solvent includes pure water.

13. The apparatus according to claim 1, wherein said inkjet printhead discharges ink by utilizing thermal energy, said inkjet printhead having a thermal energy generator for generating thermal energy applied to the ink.

14. The apparatus according to claim 1, wherein said vessel exhibits a light transmitting property.

15. The apparatus according to claim 5, wherein the fixed interval includes an angle of 90°.

16. The apparatus according to claim 7, wherein the fixed interval includes an angle of 90°.

17. A method of measuring amount of ink discharged from an inkjet printhead, comprising:

an injecting step of injecting a predetermined amount of solvent into a vessel;

an ink discharging step of driving the inkjet printhead to discharge ink into said vessel into which the solvent has been injected;

a stirring step of stirring a solution of the discharged ink and solvent;

a measuring step of measuring absorbance of the stirred solution; and an estimating step of estimating amount of ink discharged based upon the measured absorbance.

18. The method according to claim 17, further comprising a discarding step of discarding the vessel into which the solvent whose absorbance has been measured at said measuring step has been injected.

19. The method according to claim 17, wherein said injecting step includes injecting the predetermined amount of solvent into a vessel exhibiting a light transmitting property.

* * * * *